2 Sheets--Sheet 1.
L. WEINRICH.
Improvement in Centrifugal Sugar Machines.
No. 125,358. Patented April 2, 1872.
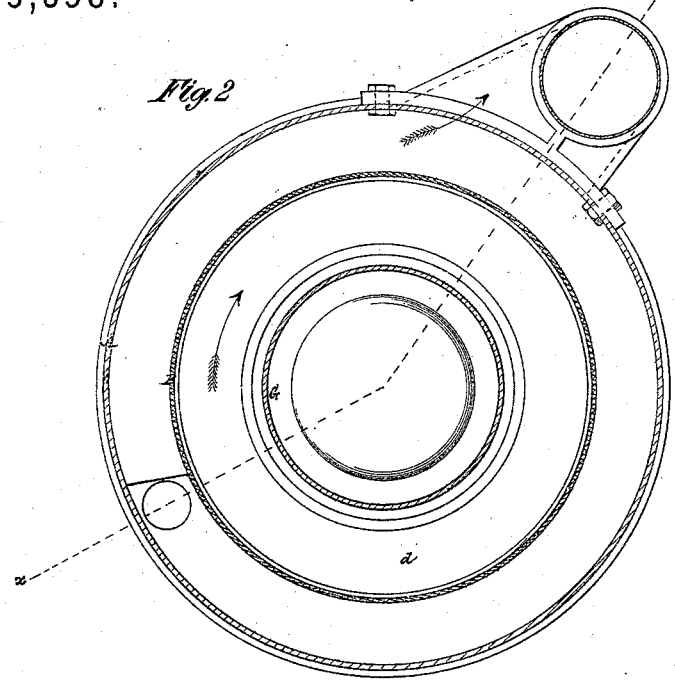
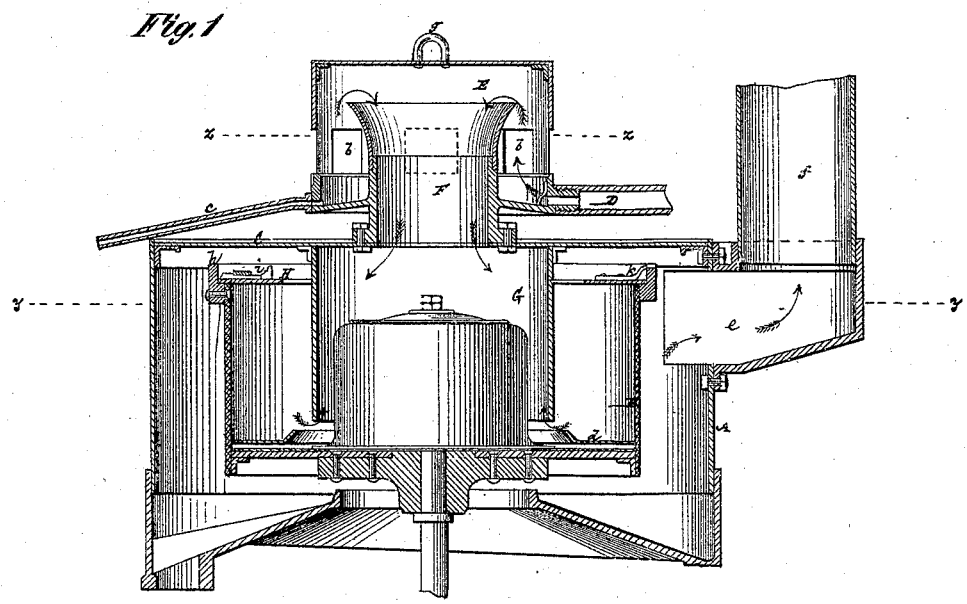

L. WEINRICH.
Improvement in Centrifugal Sugar Machines.

No. 125,358.    Patented April 2, 1872.

125,358

UNITED STATES PATENT OFFICE.

LUDWIG WEINRICH, OF BERLIN, PRUSSIA.

IMPROVEMENT IN CENTRIFUGAL SUGAR-MACHINES.

Specification forming part of Letters Patent No. 125,358, dated April 2, 1872.

*To all whom it may concern:*

Be it known that I, LUDWIG WEINRICH, of Berlin, Prussia, have invented a new and useful Improvement in Centrifugal Sugar-Machines; and I do hereby declare that the following is a full, clear, and exact description of the same, reference being had to the accompanying drawing forming part of this specification, and in which—

Figure 3:
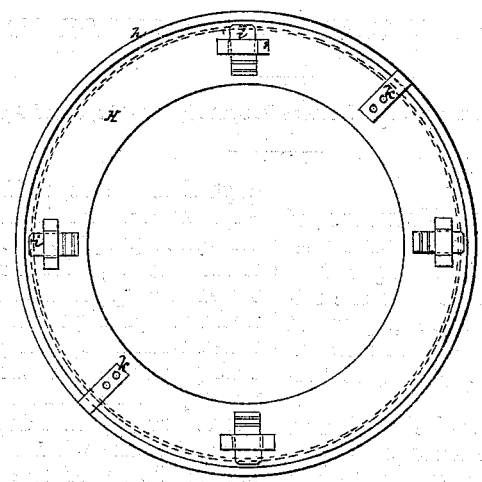
Figure 4:
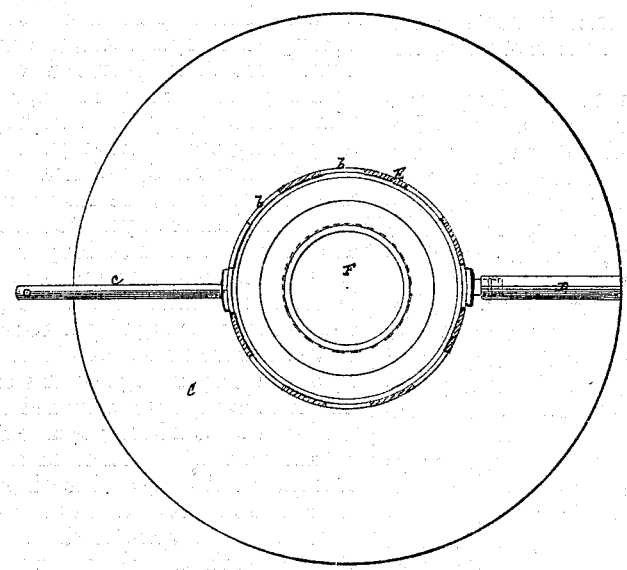

Figure 1 represents a sectional elevation at the line $x\,x$, in Fig. 2, of a centrifugal sugar-machine constructed in accordance with my invention; Fig. 2, a horizontal section of the same at the line $y\,y$ in Fig. 1; Fig. 3, a plan of upper ring connected with the cage; and Fig. 4, a horizontal section of the machine at the line $z\,z$ in Fig. 1.

Similar letters of reference indicate corresponding parts throughout the several figures of the drawing.

This invention relates to centrifugal machines in which the sugar mass is exposed to the action of steam and air for the purpose of purging and purifying the same; and the invention consists in a peculiar and advantageous construction of the machine, including a removable construction of the cover of the machine, with upper and lower attachments, to facilitate access to the interior of the cage, devices or arrangements for preventing water of condensation from reaching the sugar, and a removable ring provided with fastenings disposed on top of the cage to facilitate the working of sugar mass in lumps.

In the accompanying drawing, A represents the outer case, and B the revolving cage of a centrifugal sugar-machine. The case A is constructed with a ring at its top, on which is placed a cover, C, that closes the centrifugal machine. D is a gutta-percha or flexible tube, for conveying steam into a cap, E, where said steam is mixed with air entering by apertures $b$, and the combined steam and air drawn by the revolving motion of the cage down a throat, F, and within and down through an inner fixed case or cylinder, G, finally emerging at the bottom of said inner case for action on and among the sugar mass. Any water of condensation forming at the bottom of the cap E is carried off by a pipe or spout, $c$, and any further water of condensation forming within the cylinder G settles on the bottom of the cage B and passes off underneath said bottom without coming in contact with the sugar mass, for which purpose the bottom of the cage is made double, with an intervening space between the upper and lower portions thereof, and the upper portion $d$ of such bottom provided with an opening at its center, and preferably stopping short of the cage at its periphery. This double bottom is made of copper to prevent tainting of the sugar, as is apt to be the case when iron is used, by reason of the oxidizing of the metal. The combined steam and air passing round the bottom edge of the cylinder G thus reaches the sugar mass in a dry state or deprived of water, and, permeating the sugar, effectually purifies or purges it. As it is desirable to pass a large quantity of the steam and air in a short period of time through the sugar mass, the upper part of the outer case A is provided with an enlarged opening and escape-branch, $e$, in communication with a pipe, $f$, for carrying off the damp air passing out of the sugar mass. The cylinder G, the cover C, and attachments or devices mounted thereon, are made capable of being lifted at pleasure by means of rope and tackle attached to a hook or loop, $g$, fast on the cap E, whereby ready access may be had to the interior of the machine. The cage B is strengthened at its top edge by a band, $h$, which also serves to receive bolts $i$ of a ring, H, that rests upon the upper edge of the cage, but is not fast to it except when locked to the band $h$ by the bolts $i$. Said ring is also fitted with keys $k$, that drop into notches in the band $h$ to facilitate the fitting of the ring H to its place, so that the bolts $i$ will be in line with the holes in the band they are destined to fit. By means of this detachable ring H every facility is afforded for getting at the interior of the cage and for the introduction of the sugar mass therein in hard symmetrical lumps or pieces, as is practiced under a certain process of manufacturing sugar.

What is here claimed, and desired to be secured by Letters Patent, is—

1. The combination, with the cover C, of the inner case or cylinder G, the throat F, and the cap E, all united and made capable of being lifted in concert out of or away from the main case A and cage B, substantially as specified.

2. The cap E, provided with a steam-inlet,

D, air-apertures $b$, and a pipe or outlet, $c$, for carrying off water of condensation, in combination with the throat F and cylinder G, essentially as shown and described.

3. The cage B, fitted with a double bottom, the upper portion $d$ of which is made open, in combination with the cylinder G, beneath or past the lower edges of which the steam is admitted to the sugar mass in the cage, substantially as specified.

4. The combination of the detachable ring H and its bolts or fastenings $i$ with the band of the outer case A, essentially as described.

LUDWIG WEINRICH.

Witnesses:
   HERMANN KREISMANN,
   FELIX FESCA.